US006960002B2

(12) United States Patent
Tsai

(10) Patent No.: US 6,960,002 B2
(45) Date of Patent: Nov. 1, 2005

(54) DIRECT BACKLIGHT MODULE

(75) Inventor: Yi-Shiuan Tsai, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 52 days.

(21) Appl. No.: 10/755,542

(22) Filed: Jan. 12, 2004

(65) Prior Publication Data

US 2005/0152124 A1 Jul. 14, 2005

(51) Int. Cl.[7] .................................................. F21S 4/00
(52) U.S. Cl. ....................... 362/225; 362/396; 362/561
(58) Field of Search ............................ 362/29–30, 561, 362/260, 217, 225, 396

(56) References Cited

U.S. PATENT DOCUMENTS 5,504,545 A * 4/1996 Hagihara et al. ............. 353/74
6,843,584 B2 * 1/2005 Bang et al. ................. 362/249
2004/0012971 A1 * 1/2004 Tsai et al. ................... 362/390
2004/0037073 A1 * 2/2004 Yang et al. ................. 362/218

* cited by examiner

*Primary Examiner*—Ali Alavi
(74) *Attorney, Agent, or Firm*—Thomas, Kayden, Horstemeyer & Risley

(57) ABSTRACT

A backlight module is applied in a liquid crystal display (LCD) with a first panel and a second panel. In the LCD, the second panel is disposed opposite to the first panel and the backlight module is disposed between the first panel and the second panel. The backlight module includes a first light source, a second light source and a lamp-holding member. The lamp-holding member is disposed between the first light source and the second light source and the lamp-holding member has a first side clipping part, a second side clipping part and a vertical supporting part. The vertical supporting part is positioned between the first side clipping part and the second side clipping part. The first side clipping part and the second side clipping part hold the first light source and the second light source respectively so that the first light source and the second light source are spaced with a substantial equal distance.

14 Claims, 3 Drawing Sheets

200

DIRECT BACKLIGHT MODULE

BACKGROUND OF THE INVENTION

1. Field of the Invention

The invention relates in general to a backlight module, and more particularly to a direct backlight module applied in a liquid crystal display with two panels.

2. Description of the Related Art

Liquid crystal displays (LCDs) are widely applied in various electrical products such as personal digital assistants (PDAs), notebook computers, digital cameras, digital camcorders, mobile telephones, computer monitors, liquid crystal televisions, and the like because the technology for manufacturing the LCDs is rapidly developed and the LCDs have the advantages of being light, thin, power-saving and radiation-free. Moreover, a LCD with two panels has even more advantages than two LCDs, such as being lighter, thinner and more economical.

FIG. 1 is a schematic sectional view of a conventional LCD with two panels. Referring first to FIG. 1, a liquid crystal display (LCD) 100 at least includes a first panel 110A, a second panel 110B and a backlight module 120. The second panel 110B is disposed opposite to the first panel 110A and the backlight module 120 is disposed between the first panel 110A and the second panel 110B.

The backlight module 120 includes a light box 121, a first optical device 123A, a second optical device 123B and several light sources 122, such as several cold cathode fluorescent lamps (CCFLs). The light sources 122 are disposed within the light box 121. The first optical device 123A is disposed between the light sources 122 and the first panel 110A, and the second optical device 123B is disposed between the light sources 122 and the second panel 110B. The first optical device 123A and the second optical device 123B both include a diffusing sheet and a prism sheet.

Nowadays, long tubes are broadly used along with the need of large-size LCD 100. However, conventionally, the tubes are disposed in the light box 121 only by connecting two ends to the light box 121. That causes the centers of the extended-length tubes to be easily moved or shifted. As a result, pitches between each two adjacent tubes may differ and consequentially the optical quality of the LCD 100 is greatly influenced. Also, the extended-length light sources disposed by the conventional two-point fixing could bend and deform easily when an external force is applied thereto. This is another cause shortens the life of the tubes and harms the quality of the products.

SUMMARY OF THE INVENTION

In view of the foregoing, it is an object of the present invention to provide a backlight module applied in a liquid crystal display with a first panel and a second panel. A first light source and a second light source of the backlight module can be spaced with a substantial equal distance so that the optical quality of the LCD is improved.

An object of the present invention is to provide a backlight module, being applied in a liquid crystal display (LCD) with a first panel and a second panel. In the LCD, the second panel is disposed opposite to the first panel and the backlight module is disposed between the first panel and the second panel. The backlight module includes a first light source, a second light source and a lamp-holding member. The lamp-holding member is disposed between the first light source and the second light source and the lamp holding member has a first side clipping part, a second side clipping part and a vertical supporting part. The vertical supporting part is positioned between the first side clipping part and the second side clipping part. The first side clipping part and the second side clipping part hold the first light source and the second light source respectively so that the first light source and the second light source are spaced with a substantial equal distance.

Another object of the present invention is to provide a liquid crystal display including a first panel, a second panel and a backlight module. The second panel is disposed opposite to the first panel and the backlight module is disposed between the first panel and the second panel. The backlight module includes a first light source, a second light source and a lamp-holding member. The lamp-holding member is disposed between the first light source and the second light source and the lamp-holding member has a first side clipping part, a second side clipping part and a vertical supporting part. The vertical supporting part is positioned between the first side clipping part and the second side clipping part. The first side clipping part and the second side clipping part hold the first light source and the second light source respectively so that the first light source and the second light source are spaced with a substantial equal distance.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1:
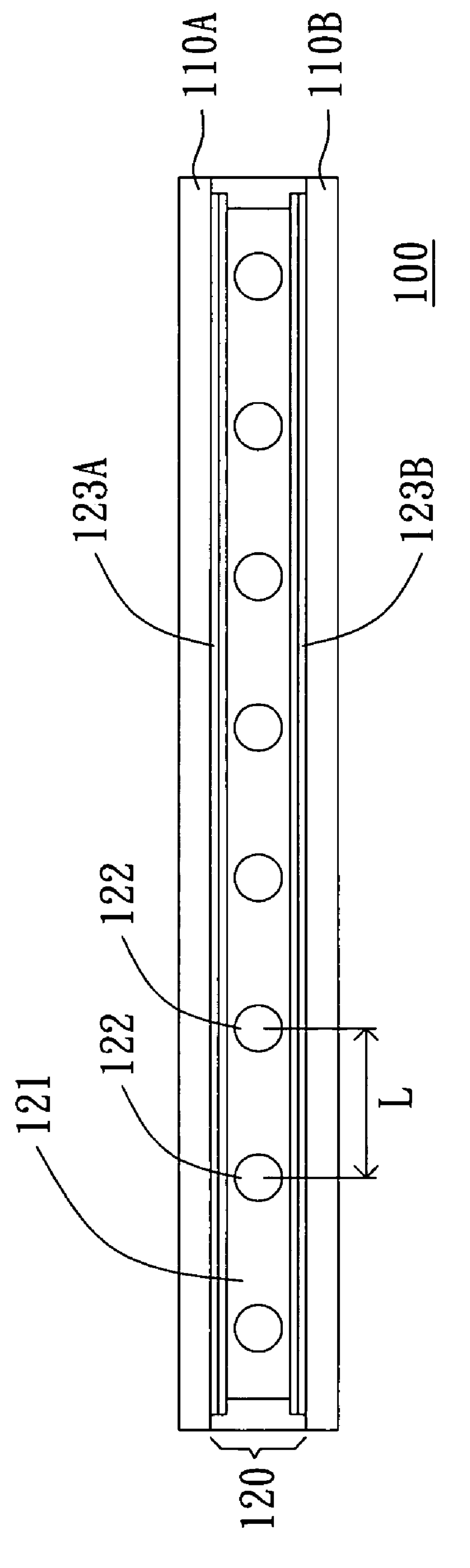
FIG. 1 is a schematic sectional view of a conventional LCD with two panels.
Figure 2:
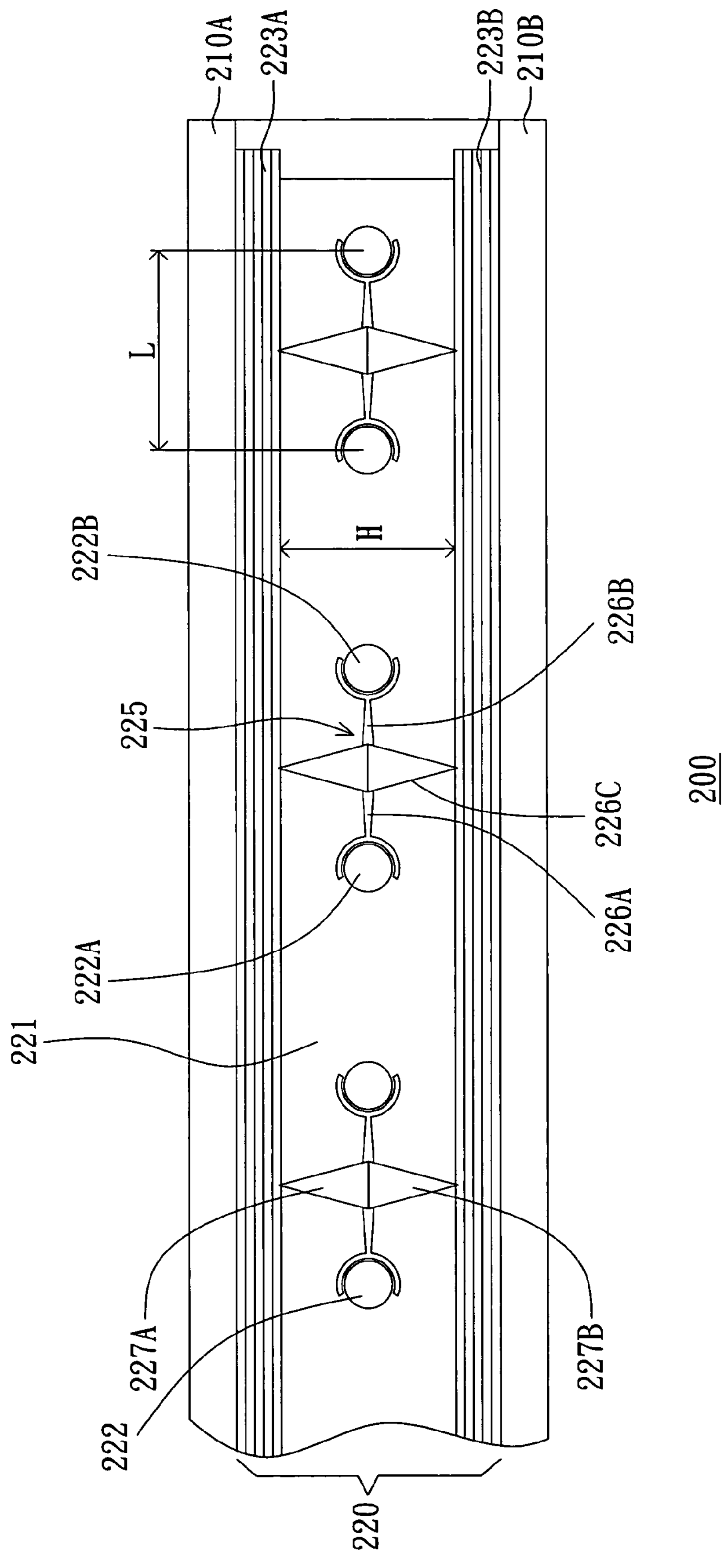
FIG. 2 is a schematic sectional view of a LCD with two panels according to a preferred embodiment of the invention.

FIG. 2 is a schematic sectional view of a LCD with two panels according to a preferred embodiment of the invention. Referring first to FIG. 2, a liquid crystal display 200 at least includes a first panel 210A, a second panel 210B and a backlight module 220. The second panel 210B is disposed opposite to the first panel 210A and the backlight module 220 is disposed between the first panel 210A and the second panel 210B.

The backlight module 220 includes a light box 221, a first optical device 223A, a second optical device 223B and several light sources in alignment, such as a first light source 222A and a second light source 222B. The first light source 222A and the second light source 222B are disposed within the light box 221, and both are preferably cold cathode fluorescent lamps (CCFLs).

The first optical device 223A and the second optical device 223B are disposed alongside a top surface and a bottom surface of the light box 221 respectively. In other words, the first optical device 223A is disposed between the first panel 210A and the light sources 222A, 222B. And the second optical device 223B is disposed between the second panel 210B and the light sources 222A, 222B. The first optical device 223A and the second optical device 223B both preferably include a diffusing sheet and a prism sheet.

Figure 3:
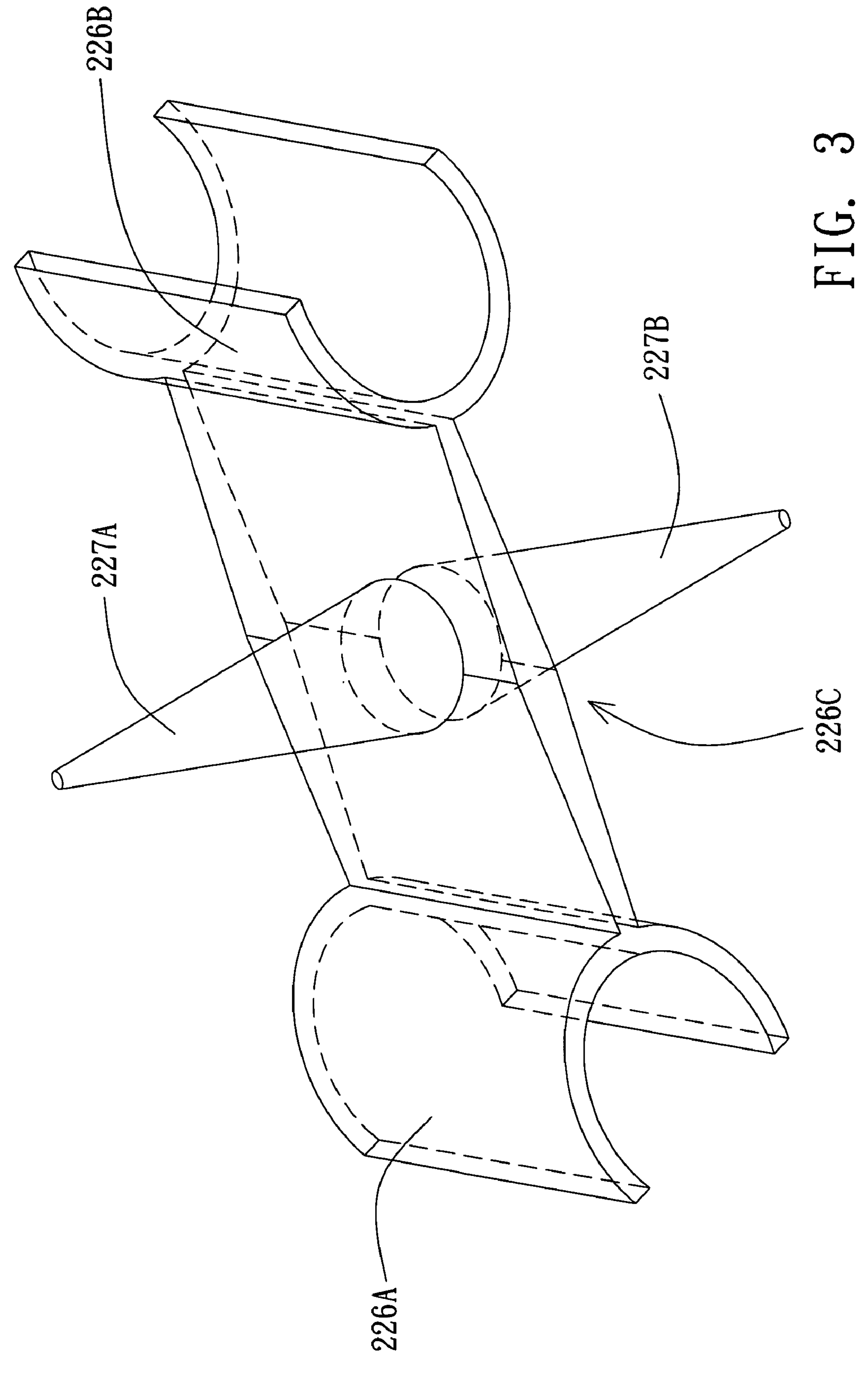
FIG. 3 is a perspective view of a lamp-holding member 225 in FIG. 2.

FIG. 3 is a perspective view of a lamp-holding member 225 in FIG. 2. Both referring to FIG. 2 and FIG. 3, the lamp-holding member 225 is disposed between the first light source 222A and the second light source 222B and the lamp-holding member 225 has a first side clipping part 226A, a second side clipping part 226B and a vertical supporting part 226C. The first side clipping part 226A, the second side clipping part 226B, and the vertical supporting part 226C are all solid component parts. While the vertical supporting part 226C is positioned between the first side clipping part 226A and the second side clipping part 226B, the first side clipping part 226A and the second side clipping part 226B hold the first light source 222A and the second light source 222B respectively. As a result, the first light source 222A and the second light source 222B are spaced with a first distance, L. The first distance L, as a pitch between each two adjacent light sources, can be invariably maintained so that the bad influence of variable pitches on the optical quality of the LCD 100 can be avoided.

Also, the vertical supporting part 226C of the lamp-holding member 225 is preferably composed of a first cone 227A and a symmetric second cone 227B. The first cone 227A is a solid body which narrows to a first point from a first round base of the first cone 227A. Similarly, the second cone 227B is a solid body which narrows to a second point from a second round base of the second cone 227B. As shown in FIG. 3, the first round base of the first cone 227A is connected to the second round base of the second cone 227B, that is to say, the first cone 227A and the second cone 227B are back-to back disposed between the first optical device 223A and the second optical device 223B; the first point of the first cone 227A is in touch with the first optical device 223A, and the second point of the second cone 227B is in touch with the second optical device 223B. As a result, the first optical device 223A and the second optical device 223B are spaced with a second distance, H. The second distance H, as a pitch between the first optical device 223A and the second optical device 223B, can be invariably maintained so that the bad influence of variable pitches on the optical quality of the LCD 100 can be avoided.

Further, the material of the lamp-holding member 225 is preferably plastic (PC), polymethylmethacrylic (PMMA) or a transparent material. Both the first cone 227A and the second cone 227B have a reflecting surface so that light, being emitted to the first cone 227A, can be reflected to the first optical device 223A, and light, being emitted to the second cone 227B, can be reflected to the second optical device 223B, separately. As a result, light intensity of the light sources is enhanced. Also, the lamp-holding member 225 can be manufactured by shooting plastic to form an unity or by reprocessing mechanically. In addition, the lamp-holding member 225 can be invariably positioned between the first optical device 223A and the second optical device 223B by controlling dimension of mechanical design.

However, the present inventions are not limited in what are described above. For example, referring to FIG. 3, it shows that the lamp-holding member 225 is composed of the upright first cone 227A and the inverted second cone 227B. But it will be understood to one skilled in the art that various shapes of the lamp-holding member 225 can be applied to space the first light source 222A and the second light source 222B with the first distance, L and to space the first optical device 223A and the second optical device 223B with the second distance, H.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module applied in a liquid crystal display with a first panel and a second panel, wherein the second panel is disposed opposite to the first panel and the backlight module is disposed between the first panel and the second panel, comprising:
- a first light source and a second light source; and
- a lamp-holding member, disposed between the first light source and the second light source, wherein the lamp-holding member comprises;
  - a first side clipping part and a second side clipping part, for holding the first light source and the second light source respectively so that the first light source and the second light source are spaced with a distance; and
  - a vertical supporting part which is positioned between the first side clipping part and the second side clipping part and extends upward and downward for spacing the first panel and the second panel.

2. A backlight module applied in a liquid crystal display with a first panel and a second panel, wherein the second panel is disposed opposite to the first panel and the backlight module is disposed between the first panel and the second panel, comprising:
- a first light source and a second light source;
- a lamp-holding member, disposed between the first light source and the second light source wherein the lamp-holding member comprises a first side clipping part, a second side clipping part and a vertical supporting part which is positioned between the first side clipping part and the second side clipping part; the first side clipping part and the second side clipping part hold the first light source and the second light source respectively so that the first light source and the second light source are spaced with a distance; and
- a first optical device and a second optical device, and the vertical supporting part of the lamp-holding member comprises a first cone and a substantially symmetric second cone, the first cone is a solid body which narrows to a first point from a first round base of the first cone, the second cone is a solid body which narrows to a second point from a second round base of the second cone, the first point of the first cone is in touch with the first optical device, and the second point of the second cone is in touch with the second optical device so that the first optical device and the second optical device are spaced with a second distance.

3. The backlight module according to claim 2, wherein the first cone and the second cone have a reflecting surface, separately.

4. The backlight module according to claim 1, wherein the material of the lamp-holding member is plastic (PC).

5. The backlight module according to claim 1, wherein the material of the lamp-holding member is polymethylmethacrylic (PMMA).

6. A liquid crystal display, comprising:

a first panel and a second panel, wherein the second panel is disposed opposite to the first panel; and a backlight module disposed between the first panel and the second panel, wherein the backlight module comprises:

a first light source and a second light source;

a lamp-holding member, disposed between the first light source and the second light source, wherein the lamp-holding member comprises:

a first side clipping part and a second side clipping part, for holding the first light source and the second light source respectively so that the first light source and the second light source are spaced with a distance; and a vertical supporting part which is positioned between the first side clipping part and the second side clipping part and extends upward and downward for spacing the first panel and the second panel.

7. A backlight module applied in a liquid crystal display with a first panel and a second panel, wherein the second panel is disposed opposite to the first panel and the backlight module is disposed between the first panel and the second panel, comprising:

a first light source and a second light source;

a lamp-holding member, disposed between the first light source and the second light source, wherein the lamp-holding member comprises a first side clipping part, a second side clipping part and a vertical supporting part which is positioned between the first side clipping part and the second side clipping part; the first side clipping part and the second side clipping part hold the first light source and the second light source respectively so that the first light source and the second light source are spaced with a distance; and a first optical device and a second optical device, wherein the vertical supporting part of the lamp-holding member comprises a first cone and a symmetric second cone, the first cone is a solid body which narrows to a first point from a first round base of the first cone, the second cone is a solid body which narrows to a second point from a second round base of the second cone; the first point of the first cone is in touch with the first optical device, and the second point of the second cone is in touch with the second optical device so that the first optical device and the second optical device are spaced with a second distance.

8. The liquid crystal display according to claim 7, wherein the first cone and the second cone have a reflecting surface, separately.

9. The liquid crystal display according to claim 6, wherein the material of the lamp-holding member is plastic (PC).

10. The liquid crystal display according to claim 6, wherein the material of the lamp-holding member is polymethylmethacrylic (PMMA).

11. The backlight module according to claim 2, wherein the material of the lamp-holding member is plastic (PC).

12. The backlight module according to claim 2, wherein the material of the lamp-holding member is polymethylmethacrylic (PMMA).

13. The backlight module according to claim 7, wherein the material of the lamp-holding member is plastic (PC).

14. The backlight module according to claim 7, wherein the material of the lamp-holding member is polymethylmethacrylic (PMMA).

* * * * *